US010634282B2

(12) United States Patent
Hatcher

(10) Patent No.: US 10,634,282 B2
(45) Date of Patent: Apr. 28, 2020

(54) EXOSKELETAL HARNESS

(71) Applicant: John J. Hatcher, Boynton Beach, FL (US)

(72) Inventor: John J. Hatcher, Boynton Beach, FL (US)

( * ) Notice: Subject to any disclaimer, the term of this patent is extended or adjusted under 35 U.S.C. 154(b) by 0 days.

(21) Appl. No.: 16/040,323

(22) Filed: Jul. 19, 2018

(65) Prior Publication Data
US 2019/0024844 A1    Jan. 24, 2019

Related U.S. Application Data

(60) Provisional application No. 62/534,369, filed on Jun. 19, 2017.

(51) Int. Cl.
*A45F 3/10* (2006.01)
*F16M 13/04* (2006.01)
*A45F 3/14* (2006.01)
*H04N 5/64* (2006.01)

(52) U.S. Cl.
CPC ............ *F16M 13/04* (2013.01); *A45F 3/10* (2013.01); *A45F 3/14* (2013.01); *H04N 5/64* (2013.01); *A45F 2003/144* (2013.01); *A45F 2003/146* (2013.01)

(58) Field of Classification Search
CPC ...... A45F 3/04; A45F 3/08; A45F 3/10; A45F 2200/0533; F16M 13/04
USPC ............................................... 224/261, 270
See application file for complete search history.

(56) References Cited

U.S. PATENT DOCUMENTS

| 1,993,485 | A | * | 3/1935 | Paul ........................ | F16M 13/04 |
| | | | | | 16/430 |
| 2,603,134 | A | * | 7/1952 | Burnam ................. | F16M 13/04 |
| | | | | | 224/185 |
| 2,738,909 | A | * | 3/1956 | Shadoin ................ | D06F 53/005 |
| | | | | | 224/231 |
| 3,541,976 | A | * | 11/1970 | Rozas ................... | A47B 23/002 |
| | | | | | 108/43 |
| 4,135,654 | A | * | 1/1979 | Chu ......................... | A45F 3/08 |
| | | | | | 224/261 |
| 4,480,775 | A | * | 11/1984 | Stanford .................... | A45F 3/14 |
| | | | | | 224/161 |
| 5,829,652 | A | * | 11/1998 | Denzer ...................... | A45F 3/14 |
| | | | | | 224/270 |
| 5,941,436 | A | * | 8/1999 | Washington ........... | A45C 15/00 |
| | | | | | 224/259 |

(Continued)

*Primary Examiner* — Justin M Larson
(74) *Attorney, Agent, or Firm* — Pepper Hamilton LLP

(57) ABSTRACT

A harness may be configured to carry a piece of equipment and be worn by a wearer. The harness may comprise, for example, a central mounting plate, an equipment support member configured to support the piece of equipment, one or more vertical support members, and a belt. The equipment support member, the vertical support members, and the belt may be fixedly or removably attached to the central mounting plate. In some instances, an equipment bag may be removably attached to a portion of the harness. The equipment bag may weigh about 25 pounds, and the harness may be configured to be worn for approximately 12 hours at a time. The harness may be configured to transfer the weight of the piece of equipment from the shoulders and chest to the hips and lower back of the wearer.

19 Claims, 11 Drawing Sheets

(56) References Cited

U.S. PATENT DOCUMENTS

| | | | | |
|---|---|---|---|---|
| 6,764,231 B1* | 7/2004 | Shubert | ............... | F16M 13/04 396/419 |
| 6,832,711 B2* | 12/2004 | Black | ............... | A43B 5/0425 224/261 |
| 7,621,066 B1* | 11/2009 | Mathison | ............... | A45F 3/10 224/185 |
| 7,665,641 B2* | 2/2010 | Kaufman | ............... | A45F 3/14 224/261 |
| 7,683,969 B2* | 3/2010 | Callahan | ............. | F16M 11/041 224/262 |
| 7,810,684 B2* | 10/2010 | May | ............... | G10G 5/005 224/265 |
| 8,267,294 B2* | 9/2012 | Yu | ............... | A45F 3/10 224/623 |
| 8,534,523 B2* | 9/2013 | Murdoch | ............... | A45F 3/04 224/581 |
| 8,690,029 B2* | 4/2014 | Murdoch | ............... | A45F 3/04 224/153 |
| 9,841,659 B2* | 12/2017 | Tipson | ............... | G03B 17/561 |
| 2004/0211799 A1* | 10/2004 | Loughman | ............. | F16M 13/04 224/262 |
| 2006/0175365 A1* | 8/2006 | Sandler | ............... | A45F 3/14 224/201 |
| 2009/0321481 A1* | 12/2009 | Licausi | ............... | A45F 3/047 224/262 |
| 2014/0209646 A1* | 7/2014 | Hoppa | ............... | A45F 3/08 224/261 |
| 2017/0269459 A1* | 9/2017 | Tipson | ............... | G03B 17/561 |
| 2019/0024844 A1* | 1/2019 | Hatcher | ............... | F16M 13/04 |

* cited by examiner

EXOSKELETAL HARNESS

CROSS-REFERENCE TO RELATED APPLICATIONS

This application claims priority to and benefit of U.S. Provisional Application Ser. No. 62/534,369, filed Jul. 19, 2017, entitled "Exoskeletal Harness," which is hereby incorporated herein by reference in its entirety.

TECHNICAL FIELD

The present disclosure is generally related to a harness adapted for carrying equipment. More specifically, the present disclosure is related to a harness configured to carry audio recording and/or sound engineering equipment in front of a person wearing the harness.

BACKGROUND

Various professions require a person to carry one or more pieces of equipment for an extended period of time. In some professions, such as an audio engineer or other similar sound recording specialist, access to the equipment being carried is important because, for example, the person operating the equipment might have a need to change functions or settings on the equipment quickly (e.g., during a filmed scene for a television program or a movie). Thus, the equipment is worn in front of the person, or hung to their side to provide easy access to the equipment.

Existing harnesses, specifically those designed for carrying sound recording equipment, are typically worn over a person's shoulders, thereby transferring the weight of the equipment to the wearer's shoulders and upper back. However, in some instances, recording equipment can weigh twenty-five pounds or more, and a day of shooting can last for twelve hours or more. Wearing a conventional shoulder-mounted harness for such a period of time can lead to accelerated fatigue, muscle soreness, and bad posture, among other things.

Additionally, existing harnesses are typically designed for a specific piece of equipment or for a specific line of equipment. The harnesses include attachment means such as carabiners or other similar removable fasteners that are positioned to attach to a specific piece of equipment at a specific location. As such, traditional harnesses do not permit a user to easily exchange one piece of equipment for another. For example, when renting a piece of unfamiliar equipment, a traditional harness can require the user to expend a significant amount of time to modify the harness to securely support and hold the rented equipment. Alternatively, the harness may not be compatible with the rented equipment at all, thereby wasting a limited supply of both time and resources on, for example, a live television broadcast.

BRIEF DESCRIPTION OF THE DRAWINGS

Aspects, features, benefits and advantages of the embodiments described herein will be apparent with regard to the following description, appended claims, and accompanying drawings where:

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The present disclosure is related to a harness for carrying various pieces of equipment. The harness is configured such that the weight of any object mounted on the harness, and being carried by a wearer of the harness, is transferred onto the hips and lower back of the wearer, as opposed to the shoulders and upper back as is common with traditional harnesses. For example, existing harnesses for sound recording equipment are typically worn over the shoulders, thereby transferring the weight of carried equipment directly to the wearer's shoulders and upper back. Such a manner of carrying weight can lead to increased fatigue as compared to dispersing the weight around the hips and lower back of a wearer, as is achieved by the improved harness as described herein.

Figure 1:
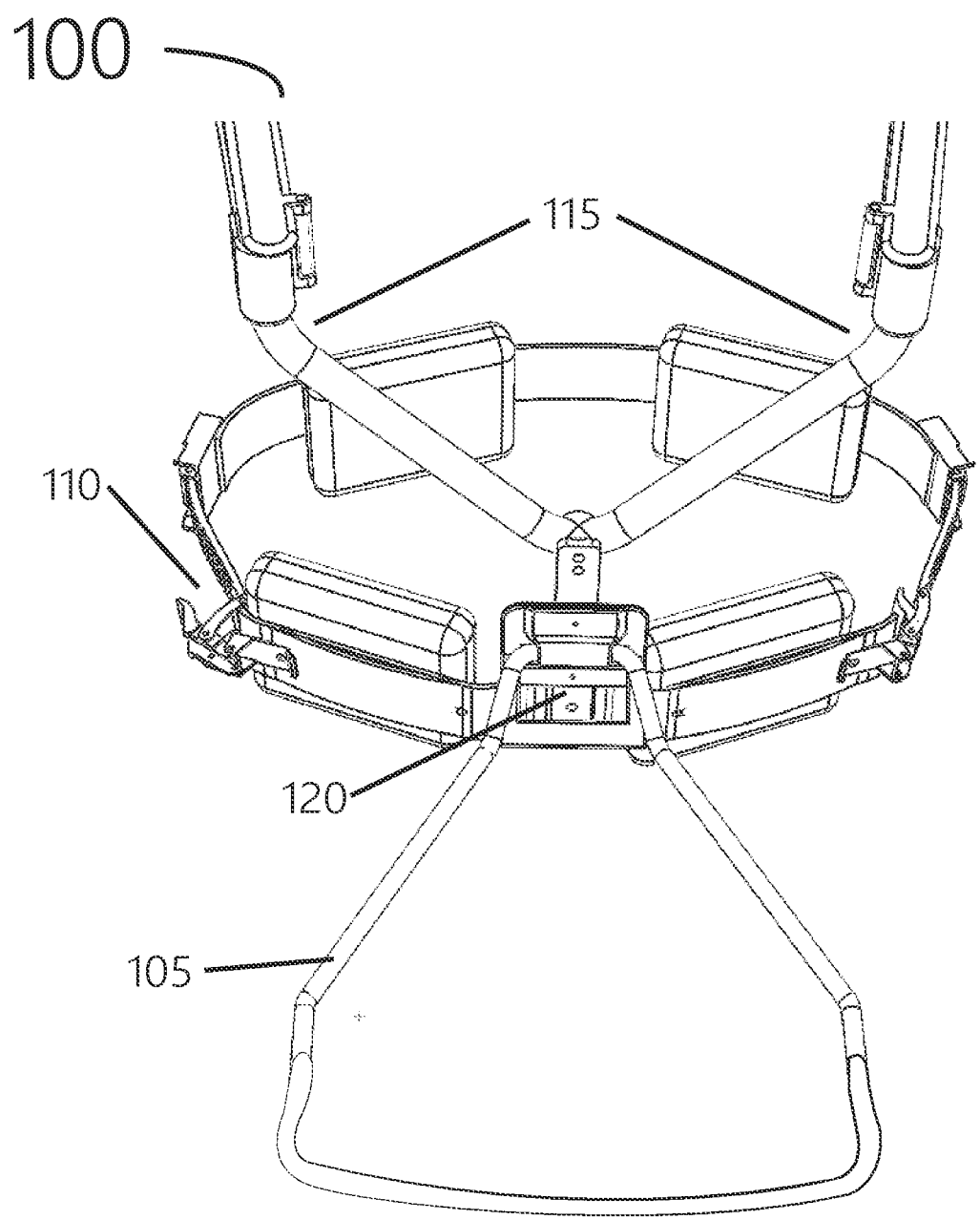
FIG. 1 depicts an illustrative equipment support harness in accordance with one or more embodiments of the present disclosure.

FIG. 1 depicts a harness 100 that is configured for carrying various equipment such as sound recording equipment. In certain implementations, the harness 100 can include an equipment support member 105 that is configured and positioned such that it projects substantially perpendicularly to the wearer's body when in a down or horizontal position. The equipment support member 105 can be configured to provide a supported space where the equipment to be carried can be set in place. The harness 100 can further include a belt 110. The belt 110 can be positioned and configured to encircle a wearer's waist when the harness 100 is worn. As such, the weight of equipment set on the equipment support member 105 is transferred through the belt 110 to the wearer's hips and lower back.

In some examples, the harness 100 can further include vertical support members 115. As shown in FIG. 1, the harness 100 includes two vertical support members 115. However, it should be noted that this is shown by way of example only, and the harness 100 can include an alternate number of vertical support members 115. For example, the harness 100 can include three vertical members, one positioned centrally (e.g., adjacent to the wearer's sternum), and two oriented at angles similar to that as shown in FIG. 1.

The various components of the harness 100 can each be fixedly or removably attached to a central mounting plate 120. For example, the belt 110 can be removably attached (e.g., snaked through a slot in the central mounting plate 120) to the central mounting plate 120 such that different sized belts can be attached to the harness 100, thereby providing various sizing options for different wearers. Similarly, in certain implementations, the belt 110 can include one or more sizing features, such as adjustable length straps, elastic portions configured to stretch/relax, and other similar sizing features.

Figure 2:
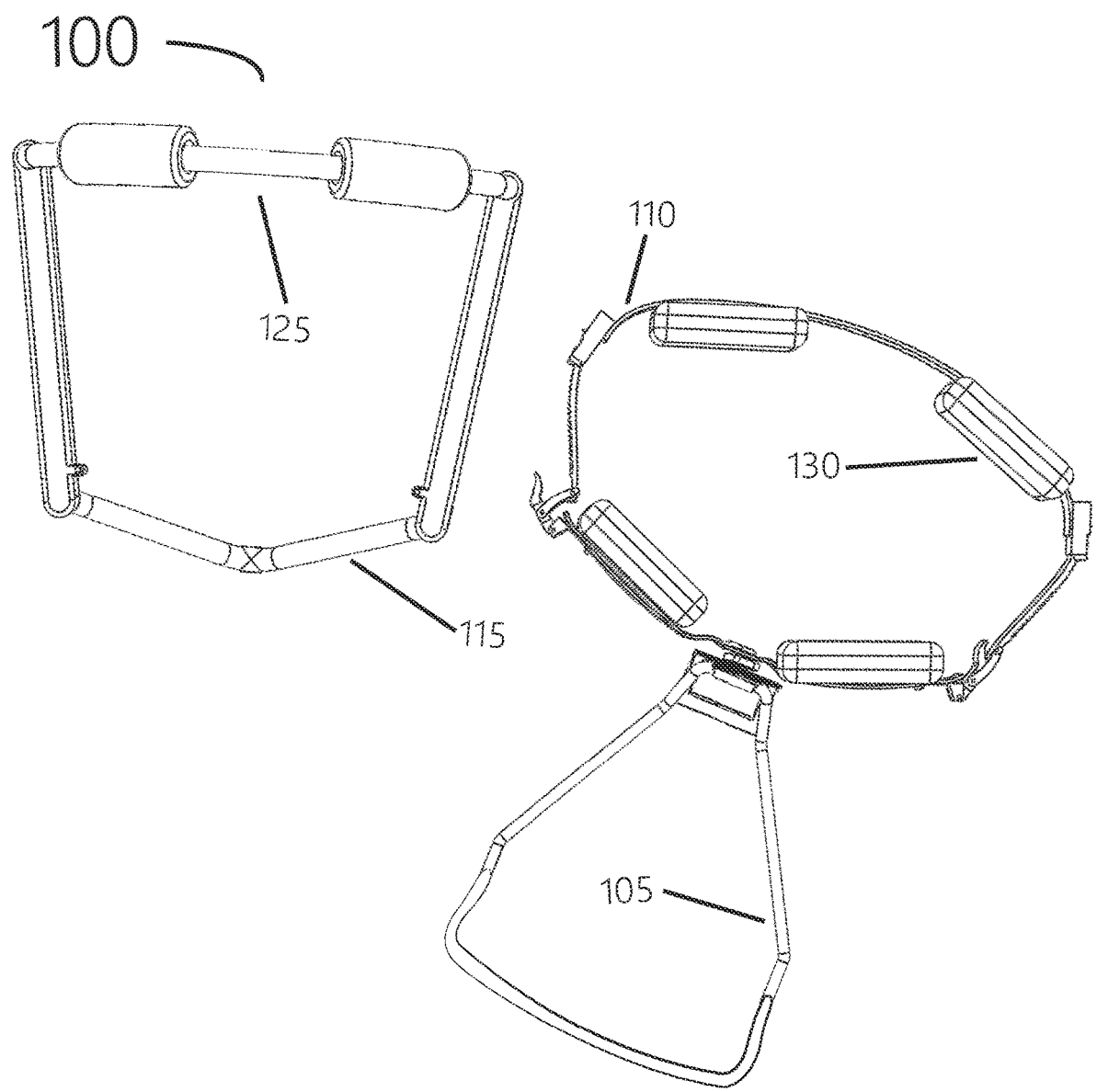
FIG. 2 depicts a top view of the illustrative equipment support harness illustrated in FIG. 1.

FIG. 2 illustrates an alternate view of the harness 100. As shown in FIG. 2, the harness 100 can further include a middle back strap 125. The middle back strap 125 can be configured to attach to the vertical support members 115 and wrap around a wearer's middle back (e.g., behind the wearer's chest) for better distribution of the weight of the harness 100 and the equipment being carried, as well as to provide improved stability when wearing the harness 100 while moving. Additional views of the middle back strap 125 are provided in FIGS. 6-7 described below, in which the harness 100 is attached to a wearer's torso.

As shown more clearly in FIG. 2, the belt 110 can include a number of cushions or pads 130. The pads 130 can be placed about the interior circumference of the belt 110 such that, when the harness 100 is worn, the pads 130 are pressed against the wearer. Thus, the pads 130 can provide added comfort to the wearer. In addition, the pads 130 can improve the weight distribution of the harness 100 (and the equipment carried thereon) by conforming to the wearer's body, thereby increasing the surface area contacting the wearer and more evenly distributing the weight.

Figure 3:
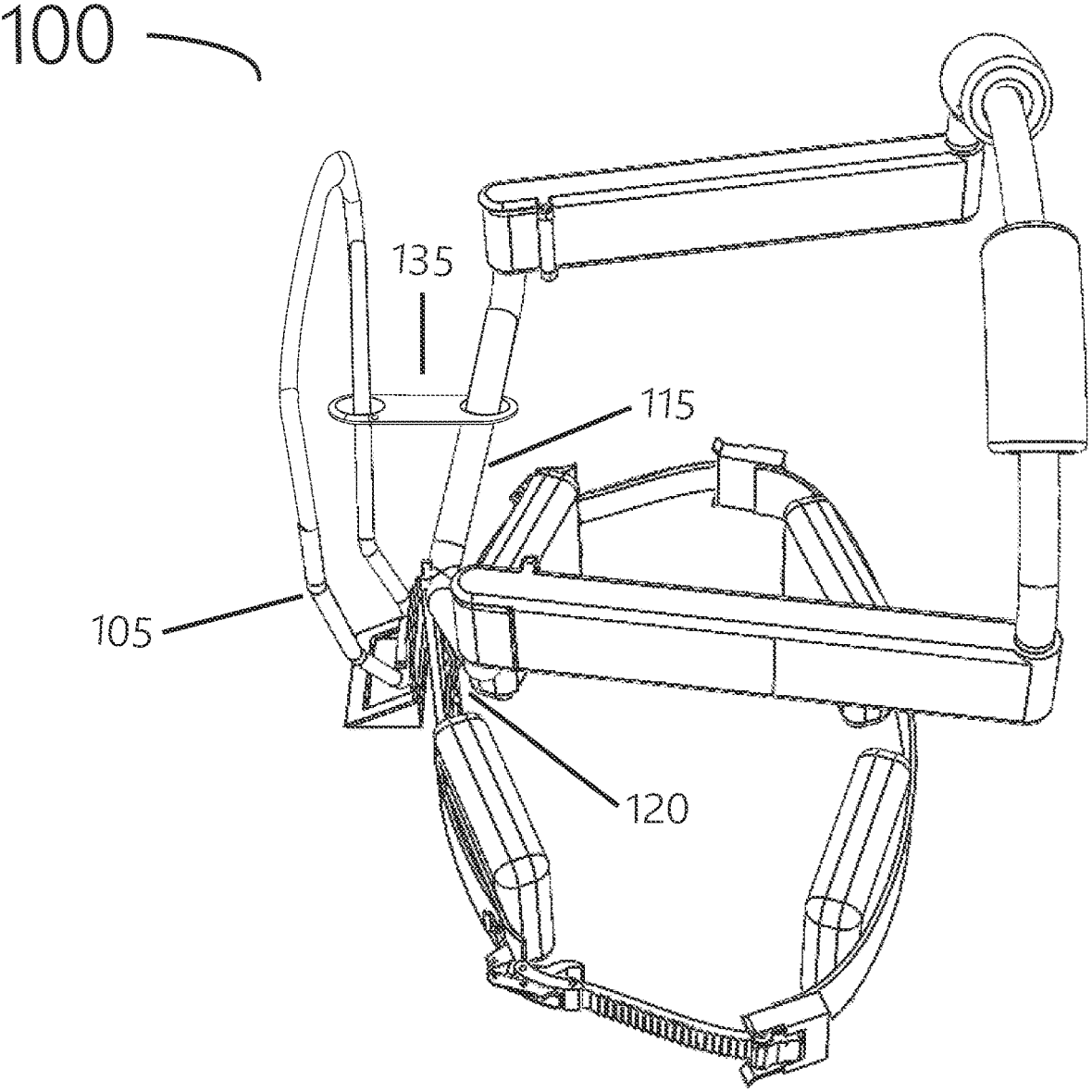
FIG. 3 depicts a top view of the illustrative equipment support harness illustrated in FIG. 1.

In certain implementations, the equipment support member 105 can be configured to be connected to the central mounting plate 120 such that the equipment support member 105 can pivot or hinge between a horizontal position (as shown, for example, in FIGS. 1 and 2) and a vertical position (as shown, for example, in FIG. 3). In certain implementations, the equipment support member 105 can be raised to a vertical position for storage or when being worn without carrying any equipment. In some examples, the harness 100 can include a clip 135 or other similar holding mechanism for holding the equipment support member 105 in the vertical position. In certain implementations, the clip 135 can be a carabiner, a hook-and-loop strap, a hook, or other similar holding mechanism attached to a vertical support member 115 and configured to releasably hold the equipment support member 105 in the vertical position.

Figure 4:
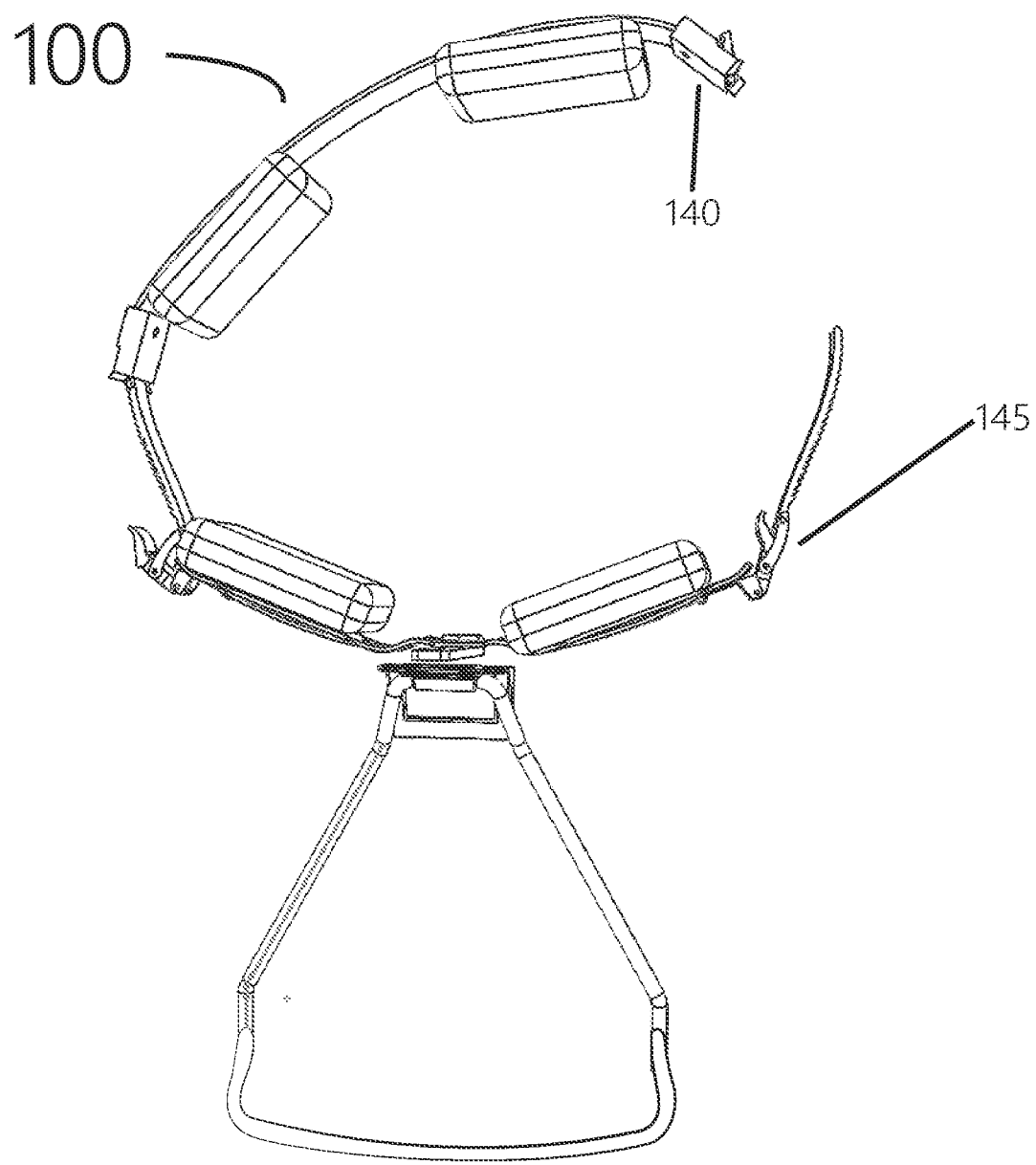
FIG. 4 depicts an illustrative equipment support harness with an opened belt component in accordance with one or more embodiments of the present disclosure.
Figure 5:
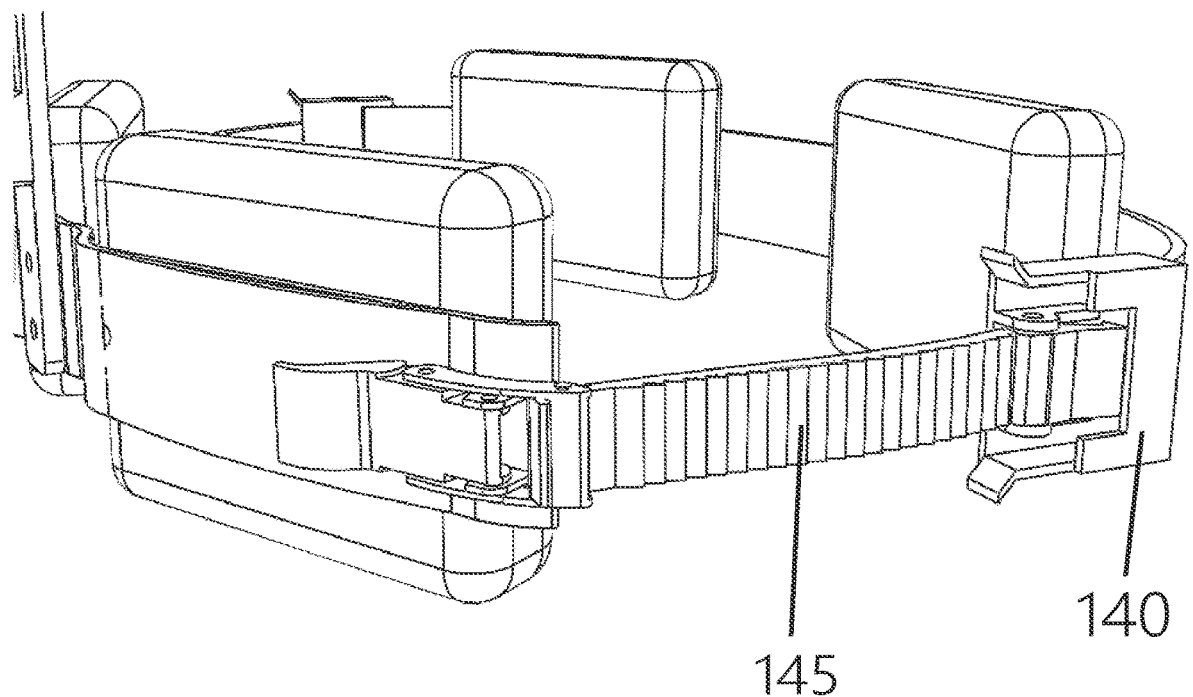
FIG. 5 depicts an illustrative fastening assembly for a belt component in accordance with one or more embodiments of the present disclosure.

FIGS. 4 and 5 illustrate additional details of the belt 110. As shown in FIG. 4, the belt 110 can include a release mechanism including a female portion 140 and a male portion 145. As shown in FIG. 5, the female portion 140 can be a buckle configured to receive the male portion 145, which, as shown in FIG. 5, can be a grooved strap configured to slide into the female portion 140. As shown in FIG. 5, the strap (male portion 145) can include a series of grooves that are positioned and configured to resist movement out of the female portion 140 until actively released.

It should be noted that the grooved strap and buckle arrangement for the female portion 140 and male portion 145 of the release mechanism of the belt 110 is shown by way of example only. Additional fastening and release mechanisms can be used in the belt 110 including, for example, a snapping mechanism, a hook-and-loop fastener, a ratcheting or cinch strap, and other similar fastening and release mechanisms.

Figure 6A:
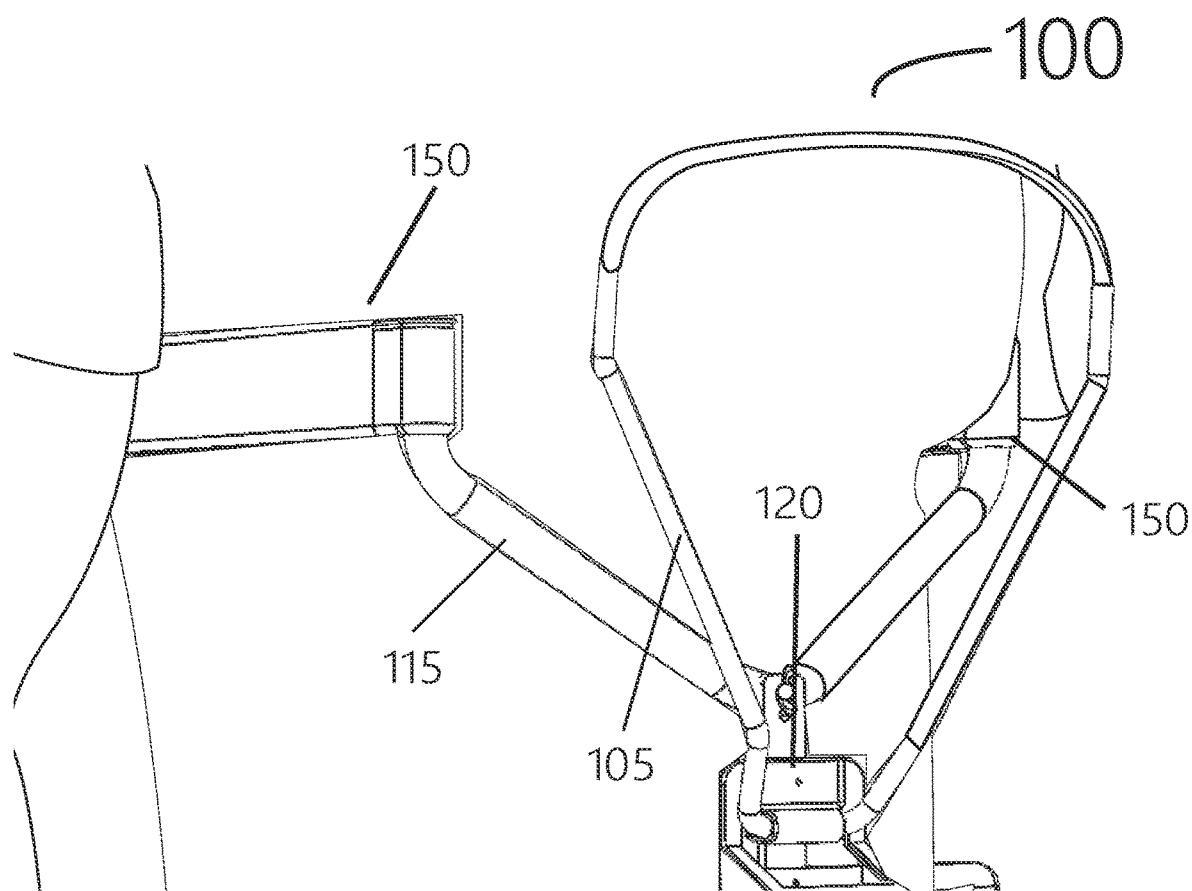
FIG. 6A depicts the illustrative equipment support harness as shown in FIG. 1 being worn on a person's torso and oriented in a vertical position in accordance with one or more embodiments of the present disclosure.
Figure 6B:
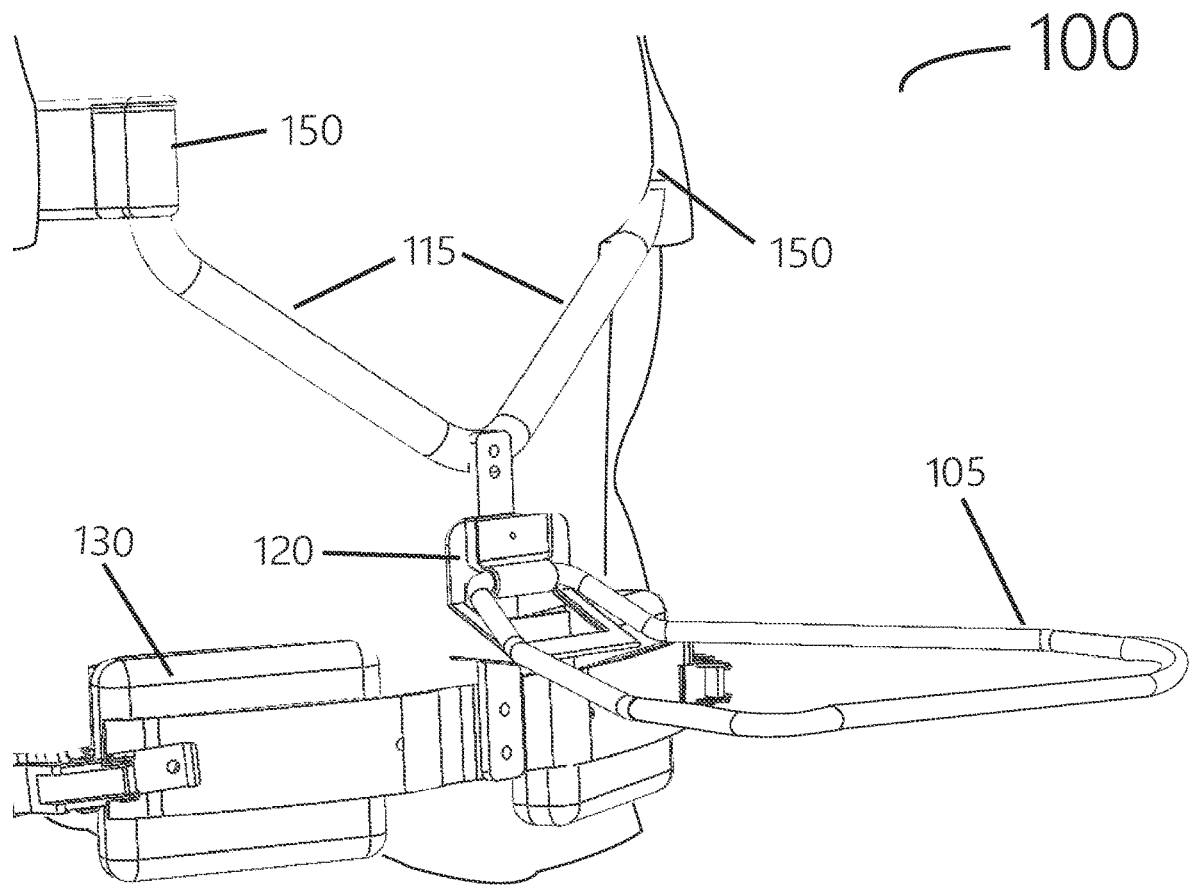
FIG. 6B depicts the illustrative equipment support harness as shown in FIG. 1 being worn on a person's torso and oriented in a horizontal position in accordance with one or more embodiments of the present disclosure.

FIGS. 6A and 6B illustrate front views of the harness 100 being worn about a person's torso. As shown in FIG. 6A, the equipment support member 105 is in a vertical position. In FIG. 6B, the equipment support member 105 is lowered into a horizontal position for supporting one or more pieces of equipment. As is shown in FIGS. 6A and 6B, the equipment support member 105 can be attached to the central mounting plate 120 using a hinged arrangement, thereby permitting the movement of the equipment support member 105. Additionally, as shown in FIGS. 6A and 6B, the central mounting plate 120 can be configured such that the vertical support members are oriented at about 90 degrees to each other, forming a V-shape having a right angle where the vertical support members 115 intersect.

Figure 7:
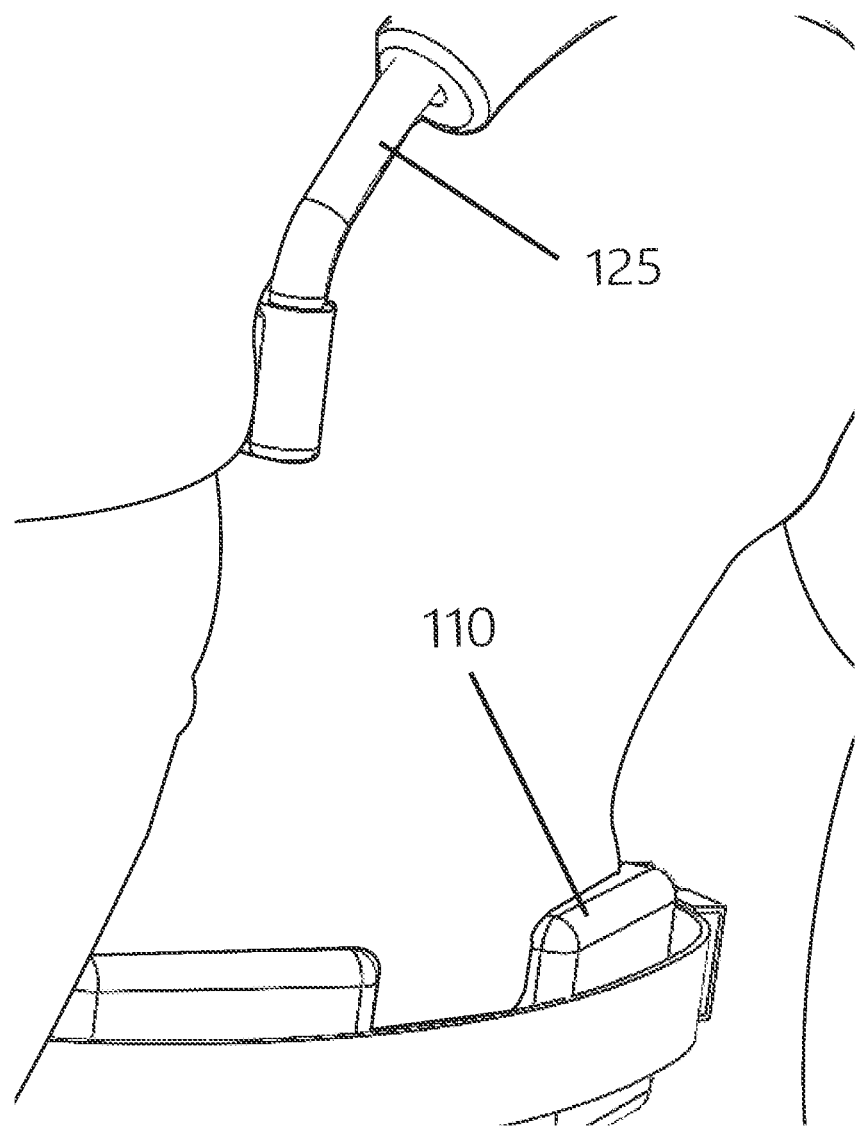
FIG. 7 depicts a back view of the illustrative equipment support harness being worn by a person in accordance with one or more embodiments of the present disclosure.

In certain implementations, as illustrated in FIGS. 6A and 6B, the harness 100 can further include strap fastening points 150 positioned at the tops of the vertical support members 115. The strap fastening points 150 can be configured to connect the middle back strap 125 to the vertical support members 115. Thus, as shown in FIG. 7, the middle back strap 125 can be positioned around the wearer's body such that it crosses the wearer's back behind their chest. As noted above, the belt 110 can be positioned such that it wraps around a wearer's hips and lower back.

Figure 8:
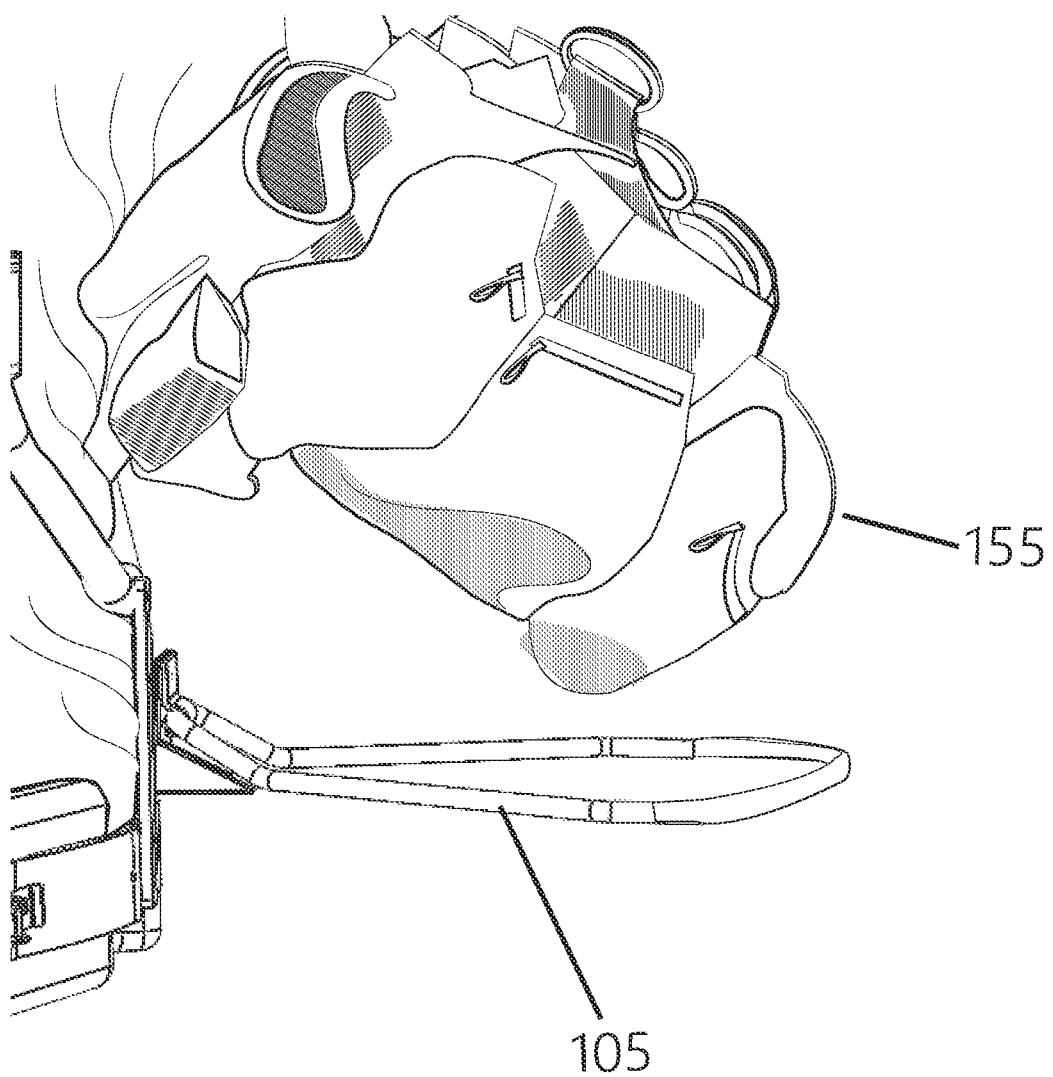
FIG. 8 depicts a piece of equipment being placed on the illustrative equipment support harness in accordance with one or more embodiments of the present disclosure.
Figure 9A:
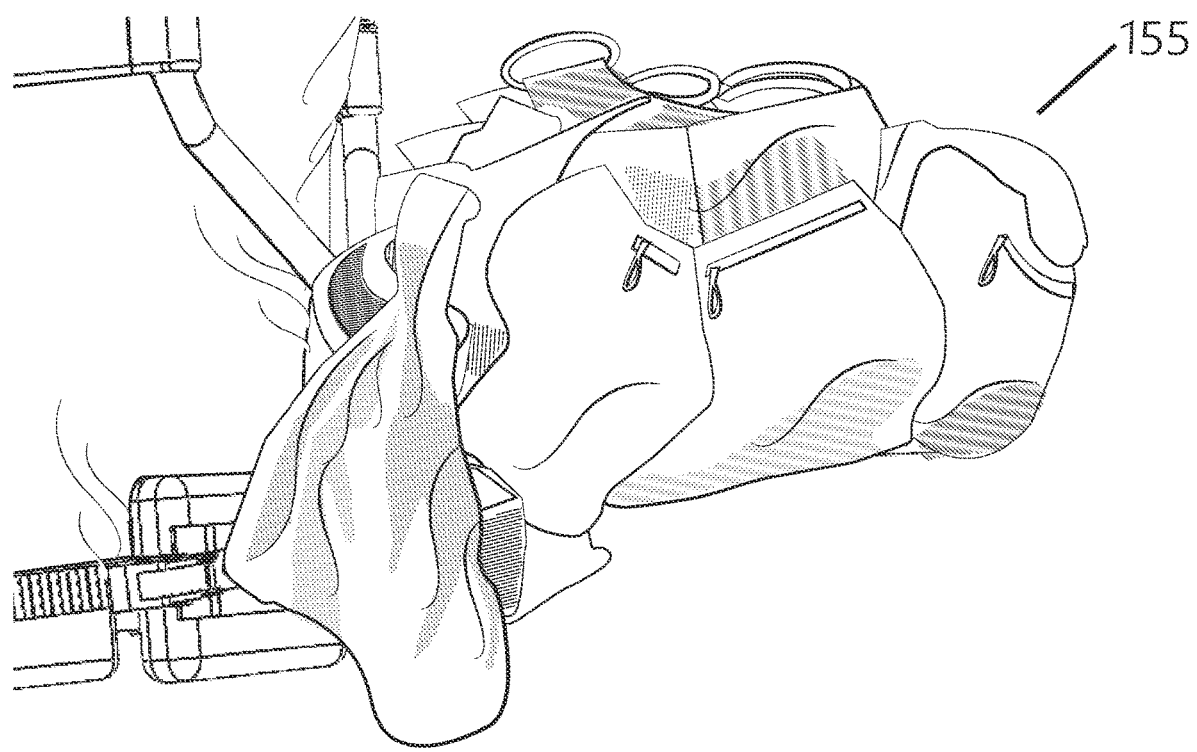
FIGS. 9A and 9B depict left and ride side views of the illustrative equipment support harness supporting a piece of equipment in accordance with one or more embodiments of the present disclosure.
Figure 9B:
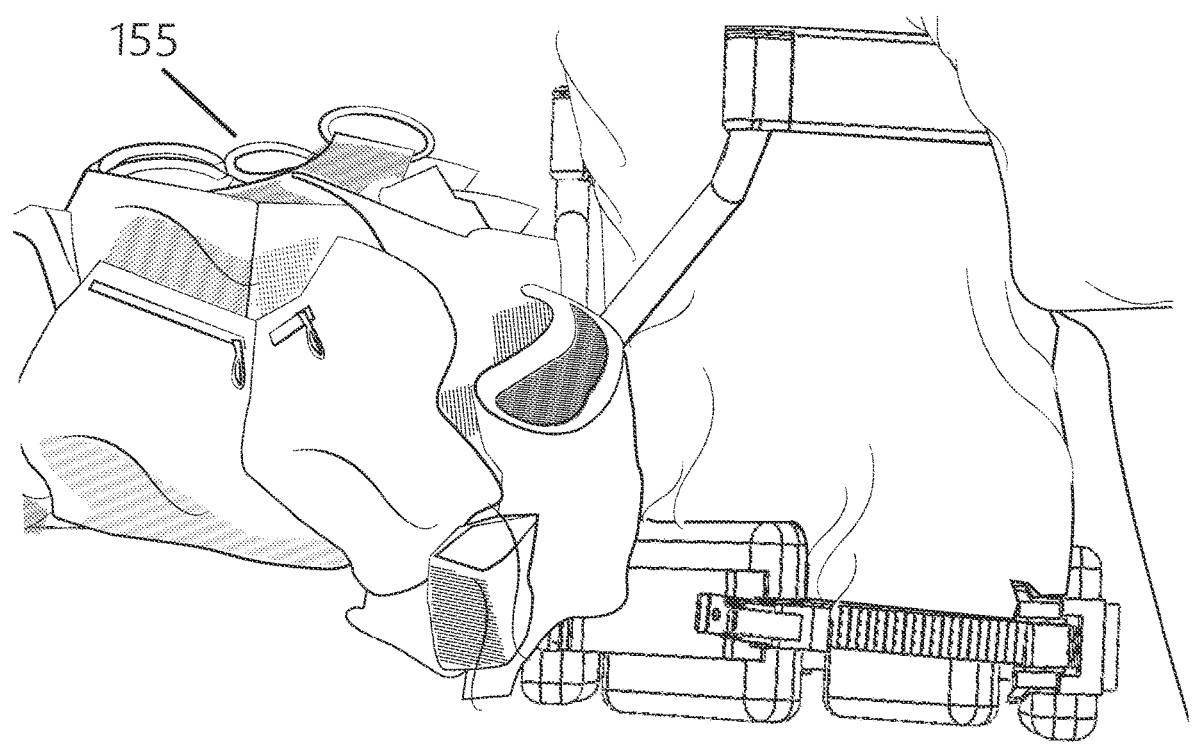

FIG. 8 illustrates the harness 100 with the equipment support member 105 in a lowered, horizontal configuration and positioned to receive a piece of equipment such as audio recording equipment bag 155. Depending upon the situation, the equipment bag 155 can include one or more pieces of equipment that are to be carried by the wearer of the harness 100 for an extended period of time. For example, as noted above, the equipment bag 155 can include over twenty-five pounds of equipment that is to be worn for approximately twelve hours a day. As shown in FIGS. 9A and 9B, when properly positioned on the harness 100, the weight of the equipment bag 155 can be transferred to the wearer's hips, lower back, and middle back. Such an arrangement provides for less fatigue and a greater potential for extended wear as compared with conventional harness designs.

In certain implementations, the equipment bag 155 can include various holding mechanisms for removably attaching the equipment bag 155 to the harness 100. For example, the equipment bag 155 can include hook-and-loop straps for attaching a portion of the equipment bag 155 to the vertical support members 115. Similarly, the equipment bag 155 can include one or more fasteners for attaching the equipment bag 155 to the equipment support member 105.

Thus, as shown in FIGS. 9A and 9B, when supported by the harness 100 as taught herein, various pieces of equipment can be carried more comfortably and more efficiently. For example, as shown in FIGS. 9A and 9B, by distributing the weight of the equipment between the wearer's middle and lower back, the weight is being carried closer to the wearer's natural center of gravity. Such an arrangement provides for more natural movement when carrying the equipment, and can provide the wearer with more comfort and agility when wearing the harness 100, thereby improving the wearer's range of motion and ability to move quickly, which are important benefits when recording sound during, for example, an action scene or a quick-moving live event, such as a sporting event.

It should be noted that, while the figures illustrate a male wearing the harness 100, the harness 100 can be worn by or easily adapted for use by a female. For example, to compensate for differences between male and female body shapes, the length of and angle between the vertical support members 115 can be adjusted for a female. Similarly, the padding and position of the belt 110 can be adjusted for a female who may have, for example, a smaller waist than a male.

The various components of the harness as described herein can be manufactured from various components. For example, the structural components such as cross-members, frame support members, equipment support members, and other similar structural components can be manufactured from a light-weight but rigid material, such as aluminum tubing and/or plate, carbon fiber, reinforced polymers such as fiberglass reinforced polymers, and other similar materials. Other components such as the padding, straps, and buckles/fasteners can be manufactured from common materials used to manufacture those products. For example, the buckles/fasteners can be made from metal, such as steel or aluminum, various polymers, hook-and-loop material, and other similar materials.

It should be noted that, while the harness as described above has been described as being used to support sound recording equipment, this is provided by way of example only. The harness as described herein, and the improved concepts associated therewith, can be used in various other professions and industries where carrying a substantial amount of equipment or weight for extended periods of time is common. For example, the harness as described herein can be modified to provide for a tool carrying mechanism that could be utilized by constructions workers, mechanics, and other similar skilled laborers. Similarly, the harness as described herein can be adapted for use in various professions and industries where equipment or other objects are picked up, carried, and put down repeatedly over a period of time. For example, warehouse workers moving stock and/or inventory can utilize the harness as described herein to aid in carrying inventory throughout their working hours.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A harness comprising:
   a central mounting plate;
   an equipment support member attached to the central mounting plate, the equipment support member configured to support one or more pieces of equipment;
   a vertical support member comprising first and second vertical support members attached to and branching out from a common location on the central mounting plate, wherein the vertical support apparatus is configured to pass under a wearer's arms and across the wearer's back; and
   a belt attached to the central mounting plate, wherein the belt is configured to wrap around the waist of the wearer.

2. The harness of claim 1, wherein the equipment support member is hingedly attached to the central mounting plate, and wherein the equipment support member can move from a horizontal position to a vertical position.

3. The harness of claim 2, wherein the equipment support member is configured to project substantially perpendicularly from the torso of the wearer when the equipment support member is in the horizontal position.

4. The harness of claim 2, wherein the harness further comprises a holding component configured to hold the equipment support member in the vertical position.

5. The harness of claim 4, wherein the holding component is selected from the group consisting of a clip, a carabiner, a hook-and-loop strap, a hook, and combinations thereof.

6. The harness of claim 1, wherein the equipment support member, the vertical support apparatus, and the belt are each fixedly attached to the central mounting plate.

7. The harness of claim 1, wherein the equipment support member, the vertical support apparatus, and the belt are each removably attached to the central mounting plate.

8. The harness of claim 1, wherein the equipment support member is configured to provide a supported space for the piece of equipment.

9. The harness of claim 1, wherein the harness is configured to transfer the weight of the piece of equipment to the hips of the wearer and the lower back of the wearer.

10. The harness of claim 1, wherein the belt comprises at least one sizing feature.

11. The harness of claim 1, wherein the belt includes a fastening and releasing mechanism comprising a male portion and a female portion.

12. The harness of claim 1, wherein the belt comprises at least one component selected from the group consisting of a cushion, a pad, and combinations thereof.

13. The harness of claim 12, wherein the at least one component is configured to conform to a portion of the wearer.

14. The harness of claim 1, wherein the vertical support apparatus further comprises a middle back strap configured to attach to the at least one vertical support member and contact the middle back of the wearer.

15. The harness of claim 14, wherein the middle back strap is configured to transfer a portion of the weight of the piece of equipment to the middle back of the wearer.

16. The harness of claim 1, wherein the first and second vertical support members are configured to form an approximately 90 degree angle with respect to one another.

17. The harness of claim 1, further comprising at least one strap fastening point positioned at an end of at least one of the first and second vertical support members.

18. The harness of claim 1, further comprising an equipment bag removably attached to one or more of the vertical support apparatus and the equipment support member.

19. The harness of claim 18, wherein the equipment bag weighs about 25 pounds.

* * * * *